(12) United States Patent
Pattekar et al.

(10) Patent No.: US 8,396,932 B2
(45) Date of Patent: Mar. 12, 2013

(54) APPARATUS AND METHOD FOR EFFICIENTLY MANAGING DATA IN A SOCIAL NETWORKING SERVICE

(75) Inventors: Amol Pattekar, San Jose, CA (US); Jeremy Matthew Werner, Burlingame, CA (US); Patrick Gates, San Francisco, CA (US); Andrew H. Vyrros, San Francisco, CA (US); Richard Wagner, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 289 days.

(21) Appl. No.: 12/831,888

(22) Filed: Jul. 7, 2010

(65) Prior Publication Data

US 2011/0252099 A1 Oct. 13, 2011

Related U.S. Application Data

(60) Provisional application No. 61/321,848, filed on Apr. 7, 2010.

(51) Int. Cl.
*G06F 15/16* (2006.01)
(52) U.S. Cl. ........................... 709/206; 709/204
(58) Field of Classification Search .................. 709/204, 709/206
See application file for complete search history.

(56) References Cited

U.S. PATENT DOCUMENTS

2005/0235062 A1* 10/2005 Lunt et al. ..................... 709/225
2009/0300066 A1* 12/2009 Guo et al. .................. 707/104.1

* cited by examiner

*Primary Examiner* — Wing F Chan
*Assistant Examiner* — Andrew Woo
(74) *Attorney, Agent, or Firm* — Blakely, Sokoloff, Taylor & Zafman LLP

(57) ABSTRACT

An apparatus, method, and machine-readable medium are described for managing data within a friend service. In one embodiment, a key/value data store can be used to provide an efficient and highly-scalable friend service database. Various techniques can be used to ensure data consistency between friend service data records. For example, in one embodiment, operations are detected which require updates to a plurality of related friend state records. A key may be generated to represent each of the operations and then used to create an entry in a write-ahead log database. In one embodiment, each entry in the write-ahead log database may specify the operation to be performed on the friend state records. If the plurality of friend state records are successfully updated, then the entry in the write-ahead log database may be deleted. However, if the plurality of friend state records are not successfully completed, then the entry is not deleted from the write-ahead log database. The friend state records associated with old entries in the write-ahead log database are checked for consistency and inconsistent records are repaired. In addition, optimistic locking techniques may be used in one embodiment to improve performance of the friend service database.

26 Claims, 9 Drawing Sheets

APPARATUS AND METHOD FOR EFFICIENTLY MANAGING DATA IN A SOCIAL NETWORKING SERVICE

CLAIM TO PRIORITY

This application claims priority to U.S. Provisional Application Ser. No. 61/321,848, filed, Apr. 7, 2010, entitled, "Apparatus and Method for Efficiently managing Data in a Social Networking Service".

BACKGROUND

1. Field of the Invention

This invention relates generally to the field of data processing systems. More particularly, the invention relates to an improved apparatus and method for managing data in a social networking service.

2. Description of Related Art

A social network is a social structure made of individuals (or organizations) which are connected by one or more specific types of interdependency, such as friendship, financial exchange, dislike, sexual relationships, beliefs, knowledge or prestige. Social networking services manage data related to social networks among online users who may be friends and/or share interests or activities. A social network service typically provides a representation of each user (often a profile); the relationships between that user and other users (i.e., the user's social connections); and a variety of additional services (e.g., photo sharing services, online chat, etc). Many social networking services are Web based and allow users to interact through the services over the internet.

Through the social networking service, users may share ideas, activities, events, and interests within their network of friends and acquaintances. Social networking services often include category places (e.g., former classmates), techniques to connect with friends (e.g., typically with self-description pages) and a recommendation system linking users based on trust. Some of the more popular social networking sites include Facebook, Twitter, MySpace, and LinkedIn.

SUMMARY

An apparatus, method, and machine-readable medium are described for managing data within a friend service. In one embodiment, a key/value data store can be used to provide an efficient and highly-scalable friend service database. Various techniques can be used to ensure data consistency between friend service data records. For example, in one embodiment, operations are detected which require updates to a plurality of related friend state records. A key may be generated to represent each of the operations and then used to create an entry in a write-ahead log database. In one embodiment, each entry in the write-ahead log database may specify the operation to be performed on the friend state records. If the plurality of friend state records are successfully updated, then the entry in the write-ahead log database may be deleted. However, if the plurality of friend state records are not successfully completed, then the entry is not deleted from the write-ahead log database. The friend state records associated with old entries in the write-ahead log database are checked for consistency and inconsistent records are repaired. In addition, optimistic locking techniques may be used in one embodiment to improve performance of the friend service database.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below are embodiments of an apparatus, method, and machine-readable medium for managing data on a social networking service. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

Described below are embodiments of a social networking service (referred to for convenience as a "friend service") which employ efficient, scalable data storage techniques to support a vast number of users. In addition, some of the embodiments described below can implement techniques to ensure data consistency such as write-ahead logging and optimistic database locking. In addition to ensuring consistency within the data records of the friend service database, these techniques enable more efficient data lookup techniques, which would otherwise result in inconsistent data.

A. One Embodiment of a System Architecture

Figure 1:
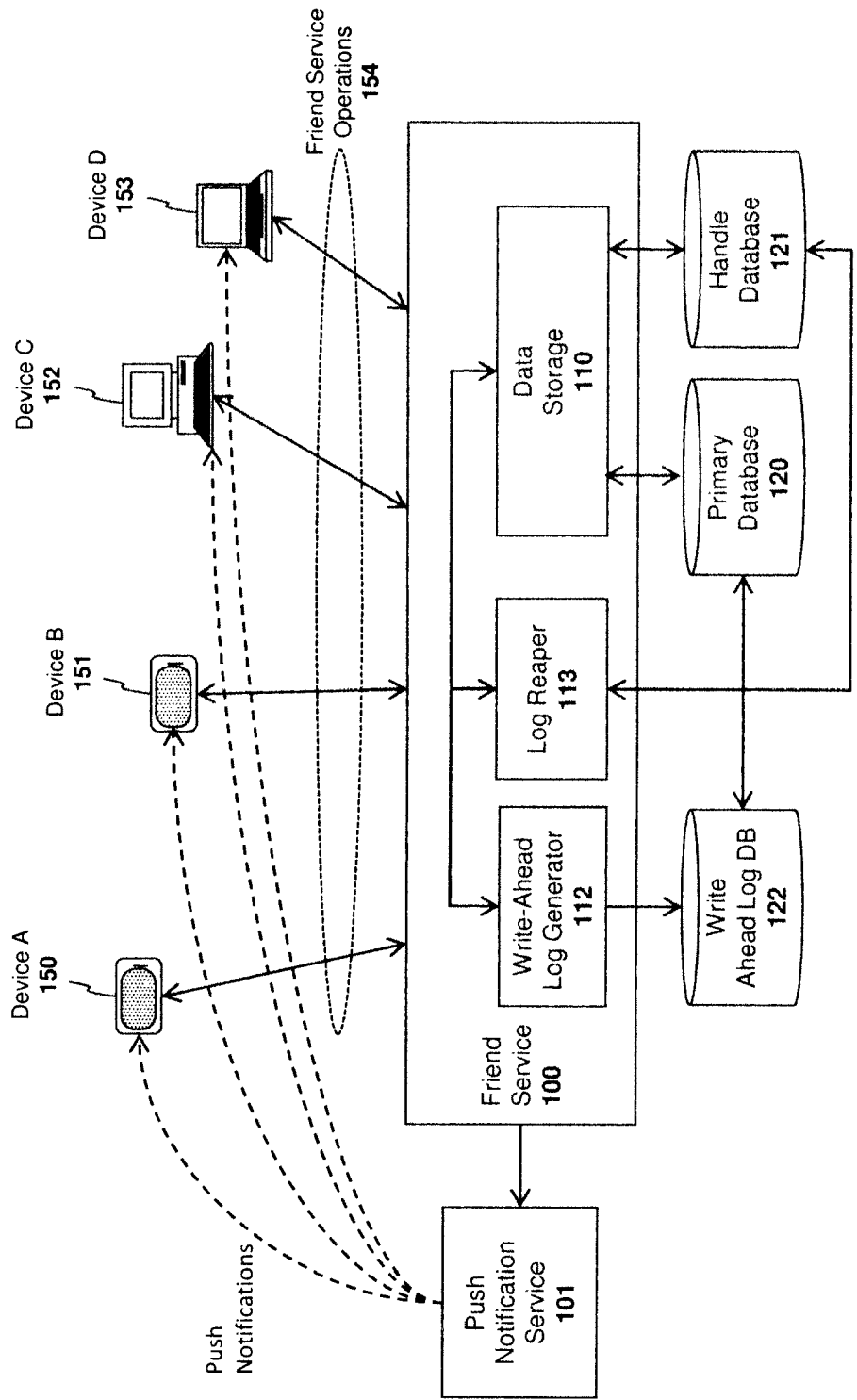
FIG. 1 illustrates one embodiment of a friend service for efficiently managing social networking data.

FIG. 1 illustrates one embodiment of a system architecture for implementing a friend service 100. This embodiment can include a data storage module 110 to store friend data within a primary data storage device 120 and a "handle" database 121. In one embodiment, the primary database 120 and handle database 121 may be key/value pair databases, examples of which include Berkley DB and MZBasic DB. These databases may be spread across a large number mass storage devices (e.g., hard drives) in a Storage Area Network (SAN) or other storage configuration. In one embodiment, the primary database 120 and the handle database 121 stores the underlying database data and the data storage module 110 implements various operations described herein to efficiently manage the data within the databases 120-121.

As mentioned above, the data storage module 110 manages "handle" data within the handle database 121. As described below, a "handle" is a unique string or ID code for identifying users who do not have an account on the friend service 100 (or who have an account but whose account has not been associated with the unique sting or ID code have not yet been identified). For example, in one embodiment, the handle takes the form of the user's email address or a hash of the user's email address (sometimes referred to below as a "token").

The friend service 100 can also include a log generator 112 for logging database updates within a write-ahead log database 122 and a log reaper module 113 for using the entries in the write-ahead log database 122 to detect and repair data conflicts within the primary database 120 and/or the handle database 121. The write ahead log database 122 may also be implemented as a key/vale pair database, although such a configuration is not required.

Moreover, although illustrated as a system with three separate databases 120-122 in FIG. 1, a single database can be used for storing the friend data, handle data and write-ahead data while still complying with the underlying principles of the invention.

As shown in FIG. 1, various different types of computing devices 150-153 may connect to the friend service 100 over various different types of networks (e.g., the Internet). The devices may include wireless devices 150-151 such as the Apple iPod Touch®, Apple iPhone®, Apple iPad®, RIM Blackberry® devices, Palm Pre® devices, etc. In addition, users may connect to the friend service 100 using standard desktop computers 152 and laptops 153. In some embodiments, the devices include application programming interfaces (APIs) designed to communicate over the network by executing a series of operations or commands 154 (described below). Applications installed on the computing devices 150-153 may then utilize the API to execute the friend service operations 154 described herein. In one embodiment, the friend service 100 is just one of many services designed and managed by an online data service provider such as those described in co-pending applications entitled Apparatus and Method for Inviting Users to Online Sessions, having inventors Andrew H. Vyrros, Jeremy Werner, and Patrick Gates, Filed Apr. 7, 2010, Ser. No. 61/321,832; Apparatus and Method for Matching Users for Online Sessions, having inventors Jeremy Werner, Phillip Smith, Andrew H. Vyrros, Patrick Gates, Ser. No. 61/321,842, Filed Apr. 7, 2010; Apparatus and Method for Securely Exchanging Connection Data, having inventors Joe Abuan, Jeff Tung, Robert Quattlebaum, Barry A. Whitebook, and Roberto Garcia Jr., Ser. No. 61/321, 851, Filed Apr. 7, 2010; Apparatus and Method for Establishing and Utilizing Backup Communication Channels, having inventors Jeff Tung, Barry A. Whitebook, Joe Abuan, Hyeonkuk Jeong, Andy Yang, Roberto Garcia, Ser. No. 61/321, 841, Filed Apr. 7, 2010; and Application Programming Interface, System and Method for Collaborative Online Applications, having inventor Mike Lampell, Ser. No. 61/321,854, Filed Apr. 7, 2010 ("Co-Pending applications"), which are assigned to the assignee of the present application and which are incorporated herein by reference.

In one embodiment of the invention, each user is identified within the friend service 100 by either a unique destination signaling identifier ("DSID") or a unique handle. In one embodiment, a DSID is used to identify users who are known to have accounts on the friend service 100. These users are sometimes referred to below as "in-network users." A handle can be used to identify users who are not known to have accounts on the friend service 100. These users are sometimes referred to below as "out-of-network users." As described below, this may include users who have not yet registered an account on the friend service and/or users who have an account on the friend service but who have not yet associated a particular handle with their account. A DSID can take on various different forms including a 64 bit ID code and a handle can be an email address or other known identifier of an out-of-network user (or a hash of the identifier, referred to as a "token"). It should be noted, however, that the underlying principles of the invention are not limited to any particular types of user ID codes for identifying users.

As illustrated in FIG. 1, in one embodiment, a push notification service 101 is used to push certain notifications such as incoming friend requests to the mobile devices 150-153. An exemplary push notification service 101 is described in the Co-Pending applications which have been incorporated herein by reference. Additional details of one embodiment of a push notification service can be found, for example, in the co-pending application entitled Automatic Notification System and Process, Ser. No. 12/042,307, Filed Mar. 4, 2008 (hereinafter "Push Notification Application"), which is assigned to the assignee of the present application and which is incorporated herein by reference.

Although push notifications are shown in FIG. 1, various other forms of notifications may be used. For example, notifications may be sent using email, short message service (SMS), and/or various other electronic messaging formats. As described below, in one embodiment, "in-network" users (i.e., those users with an account on the friend service) are notified through push notifications whereas "out-of-network" users (i.e., those users without an account or not identified on the friend service) are notified through email, SMS or other electronic messaging format.

Figure 2:
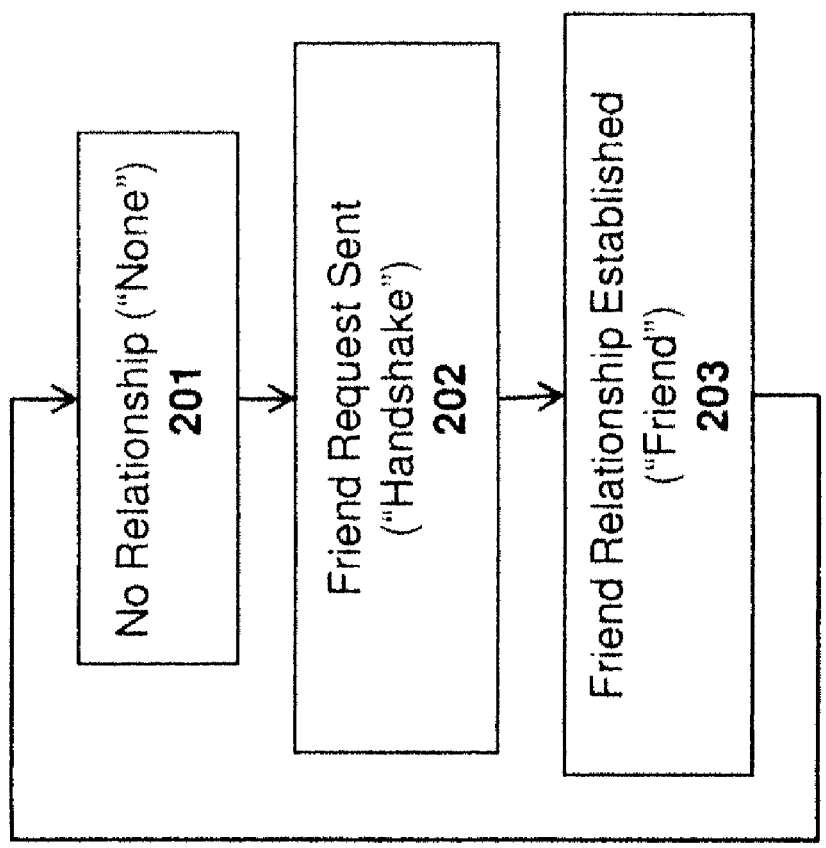
FIG. 2 illustrates one embodiment of a method for traversing through different relationships.

As illustrated in FIG. 2, in one embodiment, a relationship between two users on the friend service may cycle between three different states:

At 201, there is no relationship between the two users. This is referred to as the "none" state and, in one embodiment, it is the default state. In this state, users have not sent friend requests to one another and neither of the users are registered as "friends" within the primary friends database 120. A relationship leaves this state when one of the users makes a friend request to the other.

At 202, when a first user initiates a friend request to a second user, the second user's relationship state associated with the first user moves the "handshake" state. In one embodiment, the relationship remains in this state until the second user's acceptance of the friend request. As described below, in one embodiment, to reduce system load and data consistency issues associated with the friend request, only the second user's record (i.e., the recipient's record) is updated within the primary database 120 or the handle database 121.

At 203, the second user has accepted the first user's friend request. As a result, the relationship states of both the first user and the second user can enter the "friend" state within the primary database 120 and/or the handle database 121. A relationship may remain in the friend state until one of the users de-friends the other user. When this occurs, the relationship can revert back to the "none" state at 201.

A user identified by a DSID (e.g., an "in network" user) can send a friend request to another DSID or to a handle (e.g., an "out-of-network" user). Requests sent to another DSID are delivered in-network (i.e., within the friend service 100). Requests sent to a handle may be delivered out-of-network using, for example, an email message or an instant message. In one embodiment, the delivery may include a handle/token used to identify the recipient within the handle database, an identification code to identify the user sending the friend request and/or a URL that can be used to accept the request. In one embodiment, if the friend request was sent to the recipient using the recipient's email address, the token may be an MD5, SHA-1 or other hash of the recipient's email address. The recipient may select the URL with a mouse or cursor control device to respond to the friend request. Selecting the URL may take the user to a Web page containing data fields for logging in to the friend service 100 and/or for establishing a new account on the friend service 100. As described below, if the user already has an account on the friend service, once logged in, the friend request data from the recipient's Friend State Record may be transferred from the handle database 121 to the primary database 120.

As mentioned above, in one embodiment, all data may be stored in the underlying databases 120-122 as key/value pairs. The friend service 100 can hide this detail behind the API used on each of the devices 150-152 which may interact with the data using a predefined set of operations for managing friend data. Reads from the databases 120-122 may be accomplished by passing a key (e.g., a DSID, handle or token) and retrieving its associated value. Updates can be done by reading the old value, modifying, and replacing it, using an optimistic locking capability of the underlying persistence layer (described below).

B. Data Storage Representations

Figure 3:
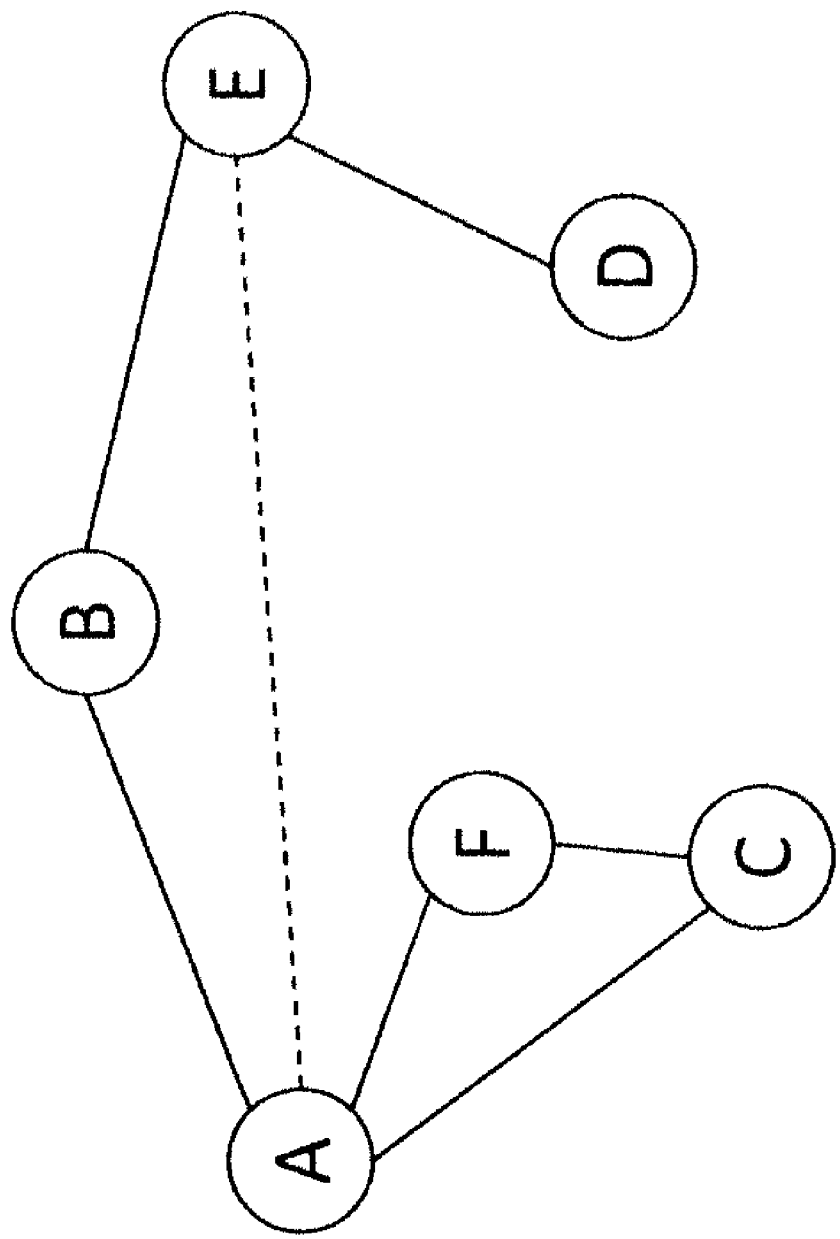
FIG. 3 illustrates an exemplary relationship graph showing relationships between a group of users.

FIG. 3 illustrates an example of friend relationships between a group of users A-F in which the relationships are represented by lines (sometimes referred to as the "edges" of the friend graph. In this example, user E has sent a friend request to user A and user A is friends with B, C, and F. These relationships may be represented within a database using different techniques. One technique, for example, can generate a record for each relationship. For example, the following records can be stored for node A to represent its relationship with each of the other nodes:

Record A-B: Friends
Record A-C: Friends
Record A-E: Friend Request Sent by E
Record A-F: Friends In this example, A-B, A-C, A-E, and A-F can be keys generated by the concatenating the DSID of A with the DSIDs of B, C, E, and F, respectively. In one embodiment, the DSIDs may be concatenated with the larger DSID following the small (although in this example, the DSID of A is assumed to be larger than the DSIDs for the other users).

One problem with this approach is that is requires a relatively expensive database query to retrieve A's friends (e.g., in response to a "getFriends" request from the API). That is, in response to such a request, each of the records needs to be identified, retrieved from the database and collated before being presented to A.

In addition to the problem of retrieving multiple records from the database and collating them, there is an inherent problem with determining which records to retrieve in the first place. As described herein, in one embodiment, the key used for the relationship records for two DSIDs is "smallerDSID-largerDSID." In the above, example, "A" could be the larger DSID in some cases, and smaller DSID in other cases. So, all records of the type "A-X" and "X-A" would need to be retrieved. In a typical database, records of the form "A-X" will be stored sequentially (sorted order), but records of the form "X-A" will be distributed all over the database for different values of "X".

One approach which reduces the cost associated with a "GetFriends" query is to include a list of each of A's friends within A's database record as shown in the following example:

Record A: Friends: B, C, F; Friend Requests: E.

Under this generalized representation, A's friends and friend requests lists are stored within a single record which may be efficiently retrieved from the database. However, this representation may be susceptible to consistency problems. For example, if A de-friends F, then A's record and F's record must both be updated for consistency. If a server crash occurs after updating A's record but before updating F's record, then A and F will have inconsistent data. When working with vast databases such as those used for social networking, errors of this type may grow quickly. As described below, one embodiment of the invention can address these consistency issues using the write-ahead log database 122 and log reaper 113, and/or by employing optimistic locking techniques within the databases 120-122.

In contrast to the generalized representation of A's record above, one particular embodiment of a Friend State Record can have the following layout:

```
type (DSID or HANDLE)
spammerCount
lastSpammerCountResetTime
incomingRequestList
    DSID
    stalkerCount
    ignoreFlag
    rid
    requestorEmail
    requestorMsg
friendList
    DSID
    rid
```

In one embodiment, for each DSID that has at least one friend relationship in the handshake or friend state and for each Handle that has at least one relationship in the handshake state, a Friend State Record such as the one set forth above can be maintained in the key/value databases 120-121. In this embodiment, the keys may be the DSIDs or handles/tokens and the values are of type Friend State.

Shown in the example above, a spammer count (spammerCount) may be maintained in the record for each DSID to identify spammers. Each DSID may be permitted to send a limited number of friend requests per specified time period (e.g., hour, day, week, month, year, etc). Each time a user sends a friend request, the spammer count value is updated by 1. When the spammer count threshold is reached, the friend service 100 may prevent the user from sending additional friend requests for the remainder of the time period (and/or may take other steps such as warning the user). In one embodiment, at the end of each time period, the spammer count may be reset to 0. In one embodiment, the last spammer count reset time (lastSpammerCountResetTime) can store the date/time at which the spammer count was last reset.

As mentioned above, the user's incoming friend request list (incomingRequestList) can also be stored within each Friend State record. Each entry in the list includes the DSID for each friend from whom a friend request has been received and the following information for each DSID:

Stalker Count (stalkerCount): In one embodiment, each time a friend request is received by a first user from a second user, and the request is rejected by the first user, the second user's stalker count is increased by 1. When the stalker count reaches a specified threshold (e.g., n attempts within a specified time period), no more friend requests are permitted from the second user to the first user. If the second user attempts to send a friend request to the first user, he/she may receive a message indicating that no more friend requests to the first user are permitted. Any additional requests may also be ignored (i.e., not registered within the databases 120-121). Various different values may be used for the number of attempts within a specified time period (e.g., 2 attempts, 3 attempts, 4 attempts, etc)

Ignore Flag (ignoreFlag): In one embodiment, when a friend request is sent from the second user to the first user, and the first user rejects the friend request, the ignore flag (which may be a Boolean variable) is set to TRUE. In response to subsequent requests, the friend service checks to determine whether the ignore flag has previously been set. If so, then the stalker count (mentioned above) is increased by 1. If the stalker count is still below the threshold, then the friend request is allowed. The first user may then reject the request a second time or accept the request (designating the second user as a friend). In addition, if the first user rejects the request, the ignore flag is set to TRUE, and as a result, that request is not displayed when the first user requests a list of all their incoming requests from the server.

Request ID (rid): In one embodiment, each friend request is uniquely identified by a request ID code. In one embodiment, the request ID code is simply a sequential string or integer value, although any convenient data format may be used.

Requestor Email (requestorEmail): In one embodiment, the email of the requestor may be stored if it is known. For example, in one embodiment, friend requests may be sent from the second user to the first user via email. In such a case, the email may be stored within the Friend State Record.

Requestor Message (requestorMsg): In one embodiment, the second user may enter a text message to the first user to be included with the friend request. The requestor message may be stored within the request message field of the Friend State Record. In one embodiment, the requestor message is a string variable having a specified size.

As mentioned above, in one embodiment, the user's friend list (friendList) is also stored is stored within each Friend State record. Each entry in the list includes the DSID or handle for each friend and the request ID code (rid) associated with the friend request which resulted in the friend relationship. For efficiency, some of the above fields can be combined into a single byte.

For DSIDs A and B, the following example shows how the friend service 100 can use A and B's Friend State records to determine the state of their relationship:

None: In one embodiment, the None state is not specifically represented in the friend service data model. It is the default state, and is derived from A and B not being in Handshake or Friend states.

Handshake: If A sent B a friend request, then the request will be represented in B's Friend State. As a result of this, when B gets his incoming friend request list, he will see A's request. In one embodiment, the request may not be represented in A's Friend State (e.g., to reduce storage, load, and consistency requirements). As a result, A will not be able to get a list of his outgoing friend requests.

Friend: If A and B are in a Friend state, then both of their Friend State records may reflect this if friendship is symmetric. Alternatively, in one embodiment of the invention, the friendship relationship may not be symmetric. For example, A may have B listed as a friend but B may not have A listed as a friend. The remainder of this discussion will assume that the relationship is symmetric, but the underlying principles of the invention are not limited to a symmetric relationship.

C. Addressing Consistency Issues

Recall from above that the None state has no representation, whereas the Handshake state can have a single unique representation in the recipient's Friend State record. As a result, there are no consistency issues for relationships in one of these two states.

By contrast, the Friend state can have two representations, one in each user's Friend State record. Consequently, one embodiment of the invention may employ techniques to ensure data consistency whenever the Friend state is involved. In one embodiment, the two API operations that involve the Friend state are referred to as Accept Friend Request (acceptFriendRequest), in which a first user accepts a friend request from a second user, and Remove Friend (removeFriend), in which a first user removes a second user as a friend.

Another consistency situation may arise when a user with a DSID adds a Handle to their profile. Recall that a handle such as an email address may be used to receive friend requests to a particular user if that user's DSID is not associated with the email address or of that user does not have an account on the friend service 100. If the recipient of the request already has a DSID but the friend service 100 is not aware of the user's email address, then when the user enters his/her email address in the system, the friend service may need to update the incoming request list of this DSID to include all incoming requests to the Handle, and then delete the requests from the Handle's database record.

To maintain consistency, one embodiment of the friend service 100 includes a write-ahead log generator 112 for creating a write-ahead log 122 of certain friend service transactions which may result in consistency problems (e.g., such as Accept Friend Request, Remove Friend, etc). As previously mentioned, the write-ahead log 122 may be a key-value database 122 separate from the key-value stores 120-121 used for storing Friend State records, although this separation is not required for complying with the underlying principles of the invention.

Figure 4:
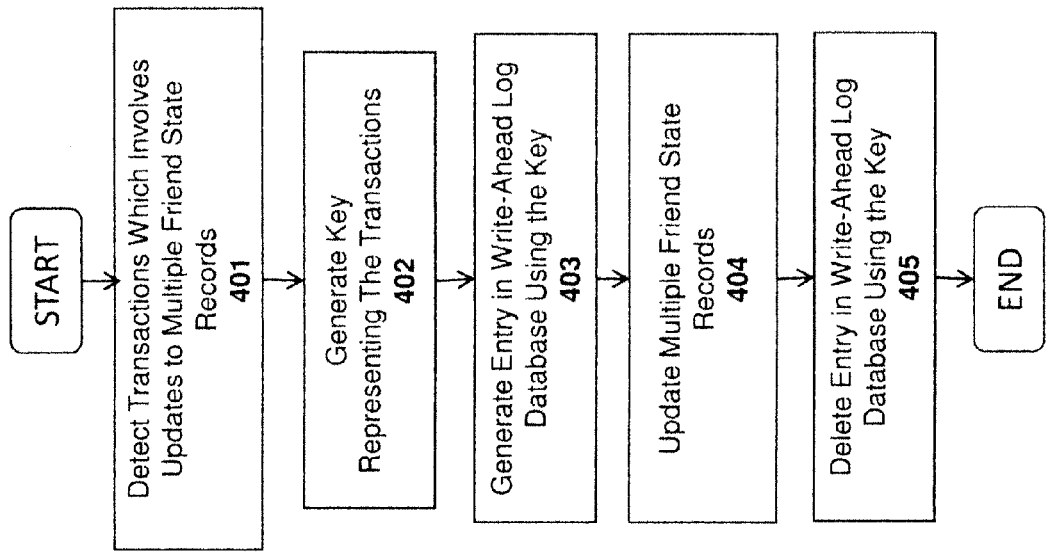
FIG. 4 illustrates one embodiment of a method for ensuring data consistency within a friend service database.

A method implemented by the friend service 100 which utilizes the write-ahead log to ensure data consistency is illustrated in FIG. 4. At 401, the friend service 100 detects a transaction which requires multiple updates to Friend State records. This may include, for example, an Accept Friend Request or a Remove Friend operation for two DSIDs or a Merge operation merging a DSID and a Handle. At 402, the write-ahead log generator 112 generates a key representing the transaction. In one embodiment, the keys for operations involving two DSIDs can be formed by concatenating the DSIDs with the larger DSID following the small (e.g., "DSID1-DSID2" where DSID1<DSID2). For an operation merging a DSID and a Handle, the key may simply be the DSID.

At 403, the write-ahead log generator 112 can generate a Log Record entry in the database 122 using the key. In one embodiment, the value can be of type Log Record, whose layout may be as follows:

```
operation (ACCEPT_FRIEND_REQUEST, REMOVE_FRIEND, or MERGE)
requestId (needed only if operation==ACCEPT_FRIEND_REQUEST)
token (needed only if operation==ACCEPT_FRIEND_REQUEST)
requestor (SMALL or BIG, needed only if operation==ACCEPT_FRIEND_REQUEST)
timestamp
```

In the above example, the operation is specified by the operation field (e.g., Accept Friend Request, Remove Friend, Merge). The requestID may be applicable only if the operation is an Accept Friend Request, and it will represent the requestID of the friend request being accepted. In one embodiment, if the Accept Friend Request was invoked with a token (e.g., a hash of a handle used to identify an out-of-network request), then the value of the token is stored. Recall that if the operation is Accept Friend Request, then the key used to store the log record may be of the type smallerDSID-largerDSID. The requestor field in the log record may be used to identify whether it was the smaller or larger DSID that initiated the friend request being accepted. This may be useful because if the request being accepted involved a token, then as part of the acceptance (e.g., to an "out-of-network" user), we need to delete from the handle's Friend State any request that was initiated by this requestor. Note that the "token" and "requestor" fields are needed only if the acceptance of the request involves a token/handle. These may not be needed when the request being accepted is an "in-network" request (as described herein). In one embodiment, the timestamp represents when the log record was created.

At 404, the multiple Friend State records are updated. For example, for an Accept Friend Request operation in which a first user accepts a friend request from a second user, the Friend State records for both the first user and the second user are updated to reflect the friend relationship. Similarly, if a Remove Friend operation is performed, then the Friend State records of both the first user and the second user must be updated to reflect the removal. Finally, if a merge operation is performed, then the DSID of the user is updated in the primary database 120 and the handle entry for that user may be deleted in the handle database 121.

Finally, at 405, after the Friend State records have been successfully updated, then the entry associated with those updates in the write-ahead log database 122 can be deleted.

Consequently, if an entry within the write-ahead log database 122 has not been deleted for a specified period of time, this may indicate the existence of a conflict between two Friend State data records. For example, if a failure occurs between the time a log record is created and the time the log record is deleted, then such a failure could leave the database in a potentially inconsistent state. In one embodiment of the invention, the log reaper 113 is used to bring the database back to a consistent state. Although a single log reaper 113 is illustrated in FIG. 1, in one embodiment, multiple log reaper threads may be executed in the background to walk through and identify the stale records in the write-ahead log database 122. In one embodiment, each entry in the write-ahead log database 122 may be time-stamped when it is entered (or, for example, may be assigned a time to live (TTL)). For each record which has been in the write-ahead log database 122 for too long (i.e., over a specified threshold), the log reaper 113 can check to determine if any of the changes specified in the log have been applied to any of the relevant Friend State records. If the changes have not been applied to any Friend State records, then the database is already in a consistent state, and the log record can simply be deleted. Alternatively, the log reaper 113 may apply the changes to both Friend State records. If the changes have been applied to some, but not all relevant Friend State records, then the log reaper 113 may fully apply those changes. If changes have already been applied to all records, then the database is already consistent, and the log reaper can delete the record from the write-ahead log database 122.

Figure 5:
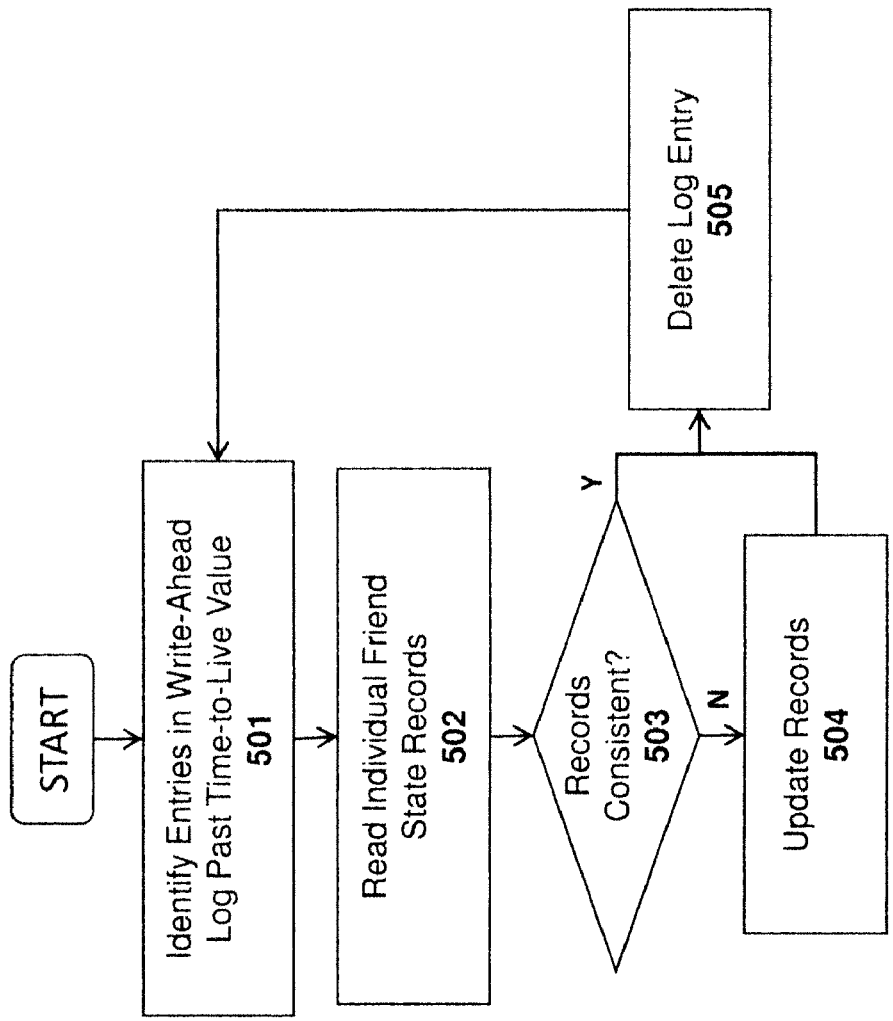
FIG. 5 illustrates one embodiment of detecting and correcting data consistency problems within a friend service database.

One embodiment of this process is illustrated in FIG. 5. At 501, stale entries in the write-ahead log database are identified. At 502, the Friend State records identified by a write-ahead log database entry are read and, at 503, a determination is made as to whether the records are consistent (as described above). If so, then at 505, the write-ahead log entry is deleted. If not, then at 504, the Friend State records are updated to be consistent (e.g., by updating one of the records to reflect the correct state). Then, at 505, the write-ahead log entry is deleted.

Figure 6:
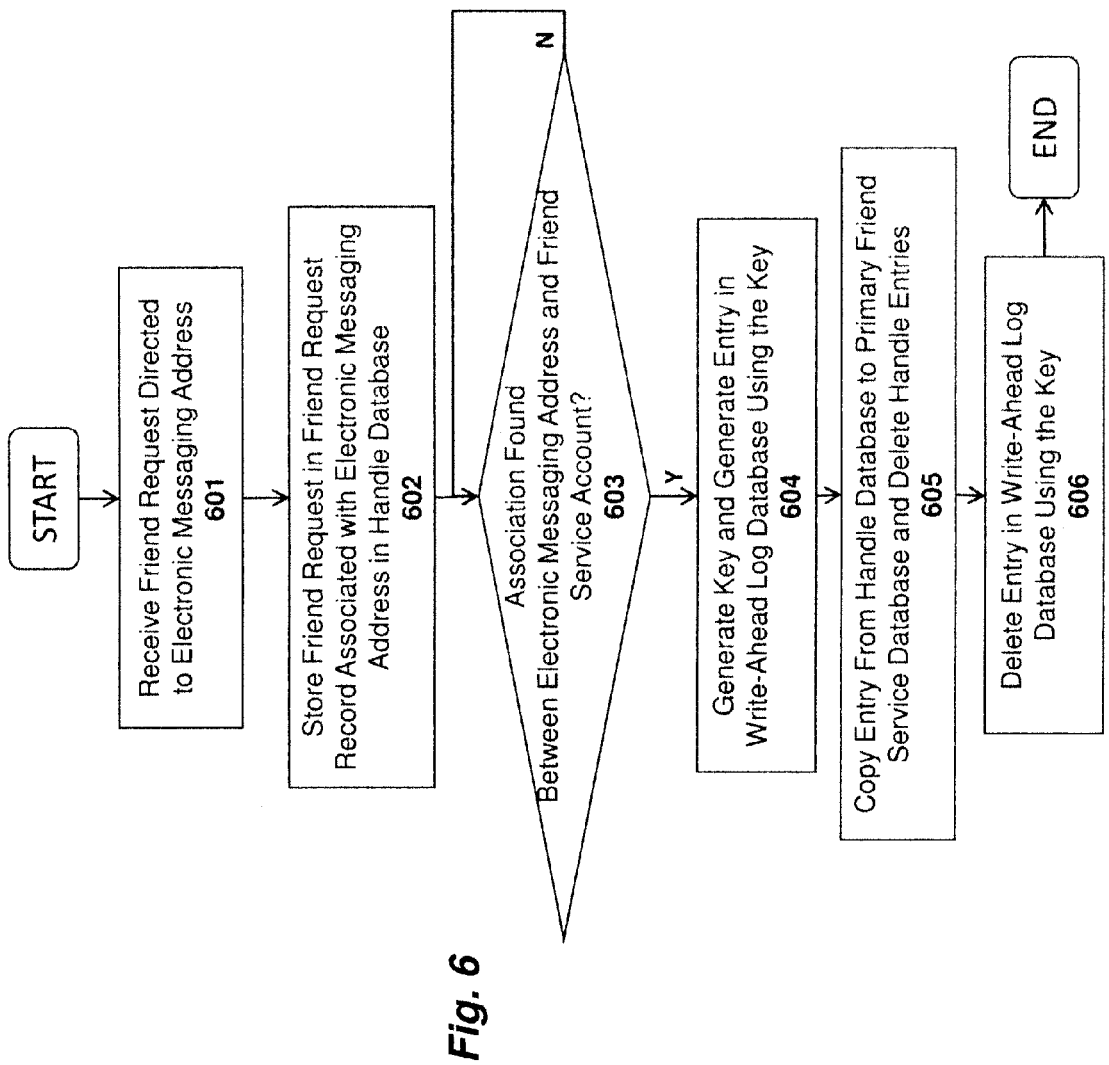
FIG. 6 illustrates one embodiment of a method for merging entries from a handle database to a primary friend service database.

One embodiment of a process for utilizing Handles for out-of-network users is illustrated in FIG. 6. At 601, a friend request directed to a particular electronic messaging address not currently associated with a DSID is received. The electronic messaging address may be any form of out-of-network electronic messaging address including, for example, email and instant messaging. If the electronic messaging address had been associated with a particular DSID, then in one embodiment, this association would be determined by the friend service and the friend request would be forwarded to the associated DSID.

At 602, the friend request is stored in a Friend Request Record associated the electronic mailing address (e.g., within the handle database 121). In one embodiment, If the handle does not already exist, a new Friend Request Record may be created. In one embodiment, handle is the electronic mailing address. In another embodiment, the handle is a hash of the electronic mailing address (sometimes referred to herein as a "token;" the terms "handle" and "token" are sometimes used interchangeably herein).

At 603, an association may be detected between the electronic messaging address the recipient's friend service account. For example, in response to receipt of an email containing the friend request, the recipient may select the URL embedded within the email and either log in or open an account on the friend service 100. In one embodiment, selecting the URL automatically transmits the DSID of the sender of the friend request and the handle/token of the recipient of the friend request.

When an association is found between the electronic messaging address and the friend service account, then at 604, a key may be generated and a Log Record entry may be added to the write-ahead log database. In one embodiment, the key may simply be the DSID of the friend request recipient.

At 605, the friend request entry may be copied from the handle database 121 to the primary friend service database 120 (e.g., by opening, updating, and saving the Friend State record in the primary database). In addition, the corresponding friend request entry may be deleted from the handle database.

At 606, if the operations in 605 have both successfully completed, then the entry in the write-ahead log database is deleted. Although not shown in FIG. 6 for simplicity, if the operations in 605 had not both completed successfully, the entry would remain in the write-ahead log database and the inconsistencies would be repaired by the log reaper (as described above).

The friend service operations 154 supported by the application programming interface (API) can include the following set of methods (many of which have already been addressed above):
getFriends
requestFriends
getIncomingFriendRequests
acceptFriendRequest
rejectFriendRequest
removeFriends In one embodiment, the Get Friends (getFriends) method is results in a read operation and the remaining operations result in write operations. In one embodiment, read operations can either return valid results or throw exceptions. Write operations can either take the action requested, throw an exception to signal an exceptional condition, or return a negative value indicating the non-exceptional reason no action was taken. All updates use the optimistic locking feature of the underlying persistence layer to guarantee that updates are being made only to the most recent version of the data.

In one embodiment, the Request Friends method (requestFriends) results in an update to a single node—the recipient's. As mentioned above, there are no consistency issues involved here. The most recent version of the recipient's Friend State can simply be updated. If the update fails due to optimistic locking, another GET can be performed to get the more recent copy of the recipient's Friend State, and update it.

Because the Spammer Count (spammerCount) in the sender's Friend State may be updated in response to the Friend Request, it is possible for a failure to occur after the recipient's Friend State is updated with the new request, but before the sender's Friend State is updated with an incremented Spammer Count. However, in one embodiment, this occurrence is not a concern given that it does not result in inconsistent data records.

In one embodiment, the Accept Friends method (acceptFriendRequest) first checks the write-ahead log database 122 to determine if there was a previously incomplete update for this DSID-pair. If it finds a log record, it can first make the database store 120 consistent with respect to that update and can delete the log record from the log database 122. After that, it can write its own log record, and then update the two Friend State records (as described above). If the Accept Friends method contained a token (used to identify an out-of-network request), then the request representing the token can be deleted from its Handle's Friend State record. After all these changes have been made, the log record can be deleted (as described above).

The Reject Friend Request method (rejectFriendRequest) is similar to the Request Friend Method since it only updates one Friend State record. It can simply get the most recent version of the rejector's Friend State, look up the particular friend request there, set the ignore flag to TRUE (as described above), and saves the record.

The Remove Friend method (removeFriend) can have the same consistency issues as the Accept Friend Request, and, as described in detail above, can use similar technique to guarantee consistency.

In response to the Get Friend Requests method (getIncomingFriend Requests), the friend service 100 may check to determine if there have been any updates to the user's profile that have resulted in a new Handle being added to the profile. If such a Handle has been added, then requests sent to this Handle can be added to this DSID, and then deleted them from the Handle. As described above, a log entry may be generated in the write-ahead log database 122. Once the addition to the DSID is complete, followed by the Handle delete, the log entry can be deleted.

As mentioned above, in one embodiment, the persistence layer—e.g., the data storage module 110 and databases 120-121 and the write-ahead log generator 112 and database 122 can employ optimistic locking techniques, resulting in more efficient data read/write operations. In contrast to traditional locking, in which a data record is "locked" while each party operates on the data record, optimistic locking assumes that multiple transactions can typically complete without affecting each other. As such, the transactions can proceed without locking the data resources that they affect. Prior to committing a data record modification to the database, a transaction verifies that no other transaction has modified its data record. For example, when used in one embodiment of the friend service 100, before committing Friend State data records resulting from the transactions to the databases 120-121, the data storage module 110 can verify that no other transaction has modified the same data record. If the check reveals conflicting modifications, then the data storage module 110 can reject the transaction.

By way of example, User A may send friend requests to both Users B and C (resulting in an update to B's and C's Friend State records as described above). If Users B and C both accept the friend requests at the same time, then two separate transactions may read, modify and attempt to store copies of User's A's Friend State record to reflect the new friend relationships (one transaction to reflect B's acceptance of the friend request and another to reflect C's acceptance of the friend request). To allow both transactions to proceed would result in an incorrect state because one would overwrite the other. As such, using optimistic locking, both transactions can be rolled back. One embodiment of the invention may also employ conflict resolution logic to resolve conflicts of this nature. For example, the conflict resolution logic may detect that a record being stored in the database is an older version and may attempt to merge the updates made to the record by the two transactions. In the example above, this would mean updating the record to include the changes resulting from both User B's and User C's acceptance of A's friend request.

While the mechanisms described herein help guarantee consistency, they make an assumption about the durability of writes made to the persistence layer. While this assumption holds most of the time, there are rare conditions when this can be violated. One example is where the persistence layer uses a single write master-multiple read replica model, and a network partitioning occurs resulting in multiple nodes becoming masters. When the partition resolves, only one node will remain master and may rollback transactions committed on the other master. This can result in inconsistencies. One embodiment of the system can make a best-effort attempt to detect and correct such inconsistencies by running consistency checker threads in the background, which will slowly iterate over the Friend State records and check that entries from corresponding records are consistent. For example, determining if the friends in User A's friend list all have User A listed as a friend. In one embodiment, this job can run a global integrity check to periodically verify that nothing strange is happening. This may generally be a good practice even if it is only run read-only.

In one particular embodiment of the friend service, the following operations are supported (several of which have been discussed above in detail):

A. A DSID can send a friend request to another DSID or to a Handle. Requests sent to another DSID are delivered in-network. Requests sent to a Handle are delivered out-of-network, and the delivery message can contain a Token and the DSID originating the request, both of which can be used to accept the request. For example, the Token may be used of identify the user within the handle database 121 and the DSID may identify the requesting user. If the out-of-network request is via email, a URL may be included in the email body which identifies both the Token and the DSID. As described above, clicking on the URL may take the user to a Web page having login fields (to log in to an existing account) and account setup fields (to establish an account).

B. A DSID can obtain a list of all the incoming friend requests.

C. A DSID can accept a friend request. Acceptance can put the relationship in the Friend state. In one embodiment, this is a symmetric relationship.

D. A DSID can reject a friend request. The sender of the request may not be notified of the rejection.

E. A DSID can accept a friend request sent to a handle in one of two ways:
1. The DSID can add the Handle to their profile after a vetting process. Once they do that, requests sent to the Handle can show up in the incoming friend requests list of the DSID and the DSID can then accept or reject the requests. If the Handle is an email address, the vetting process can include sending an email to confirm that the email with an embedded URL to confirm that address is valid.

2. The DSID can use a Token issued by the friend service to accept a specific request sent to a Handle, without having to add the Handle to their profile.

F. A DSID may not be provided the option of obtaining a list of outgoing friend requests that are still open.

G. A DSID can send repeat friend requests to a user:

1. If the recipient is a DSID and the previous request is still open, a new request will not be generated. If the previous request was rejected, a new request will be generated, so long as the sender has not exceeded their Stalker Count with respect to this recipient. If the Stalker Count has been exceeded, the request will be disallowed.

2. If this recipient is a Handle, a new request can be generated so long as the sender has not exceeded the Stalker Count with respect to this Handle.

H. A DSID can obtain a list of all their friends

I. A DSID can de-friend another DSID from their friend list. De-friending can also be symmetrical.

J. A DSID can send only a limited number of friend requests per predefined time interval (to avoid spam).

Figure 7:
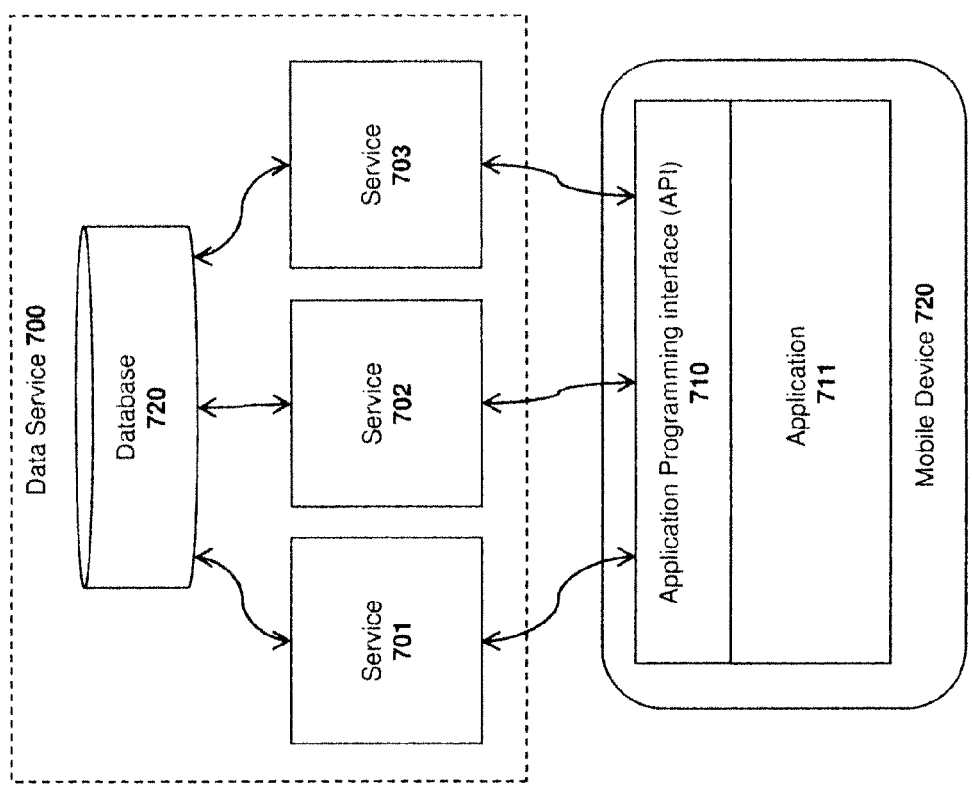
FIG. 7 illustrates one embodiment of an application programming interface (API) on a wireless device communicating with a set of services.

As illustrated in FIG. 7, one embodiment of the invention is implemented within the context of a mobile device 120 having a predefined application programming interface ("API") 710 for interfacing with one or more applications 1911 and one or more network services 701-703. As shown in FIG. 7, the network services 701-703 may be designed and/or managed by the same online data service 100 (although such a configuration is not required). Applications 711 such as P2P gaming applications, collaborative online applications, or any other types of applications may be designed to access the network services 701-703 through the API 710 by making calls to the API 710. The design of applications 711 may be facilitated using a software development kid ("SDK") provided by the developer of the API 710 and the network services 701-703.

As illustrated, each of the services may be provided with access to a database 720 for storing data used by the services. One particular example provided above is the database 1512 used by the matchmaker service 111. Any database type may be used (e.g., MySQL, Microsoft SQL, etc) but in one particular embodiment, MZBasic DB, a computer software library which provides a high-performance embedded database, is used.

The API 710 may be designed to communicate and exchange information with the network services 701-703 using any suitable network protocol stack including, for example, TCP/IP at the network layer and HTTPS at the application layer. Moreover, the services may be implanted on any virtually any computing platform including, by way of example. The foregoing examples are provided merely for the purpose of illustration. The underlying principles of the invention are not limited to any particular mechanism for linking applications to services or any particular set of network protocols.

The API implemented in one embodiment, is an interface implemented by a software component (hereinafter "API implementing software component") that allows a different software component (hereinafter "API calling software component") to access and use one or more functions, methods, procedures, data structures, and/or other services provided by the API implementing software component. For example, an API allows a developer of an API calling software component (which may be a third party developer) to leverage specified features provided by an API implementing software component. There may be one API calling software component or there may be more than one such software component. An API can be a source code interface that a computer system or program library provides in order to support requests for services from a software application. An API can be specified in terms of a programming language that can be interpretative or compiled when an application is built, rather than an explicit low level description of how data is laid out in memory.

The API defines the language and parameters that API calling software components use when accessing and using specified features of the API implementing software component. For example, an API calling software component accesses the specified features of the API implementing software component through one or more API calls (sometimes referred to as function or method calls) exposed by the API. The API implementing software component may return a value through the API in response to an API call from an API calling software component. While the API defines the syntax and result of an API call (e.g., how to invoke the API call and what the API call does), the API typically does not reveal how the API call accomplishes the function specified by the API call. Various function calls or messages are transferred via the one or more application programming interfaces between the calling software (API calling software component) and an API implementing software component. Transferring the function calls or messages may include issuing, initiating, invoking, calling, receiving, returning, or responding to the function calls or messages. Hence, an API calling software component can transfer a call and an API implementing software component can transfer a call.

By way of example, the API implementing software component 2010 and the API calling software component may be an operating system, a library, a device driver, an API, an application program, or other software module (it should be understood that the API implementing software component and the API calling software component may be the same or different type of software module from each other). The API calling software component may be a local software component (i.e., on the same data processing system as the API implementing software component) or a remote software component (i.e., on a different data processing system as the API implementing software component) that communicates with the API implementing software component through the API over a network. It should be understood that an API implementing software component may also act as an API calling software component (i.e., it may make API calls to an API exposed by a different API implementing software component) and an API calling software component may also act as an API implementing software component by implementing an API that is exposed to a different API calling software component.

The API may allow multiple API calling software components written in different programming languages to communicate with the API implementing software component (thus the API may include features for translating calls and returns between the API implementing software component and the API calling software component); however the API may be implemented in terms of a specific programming language.

Figure 8:
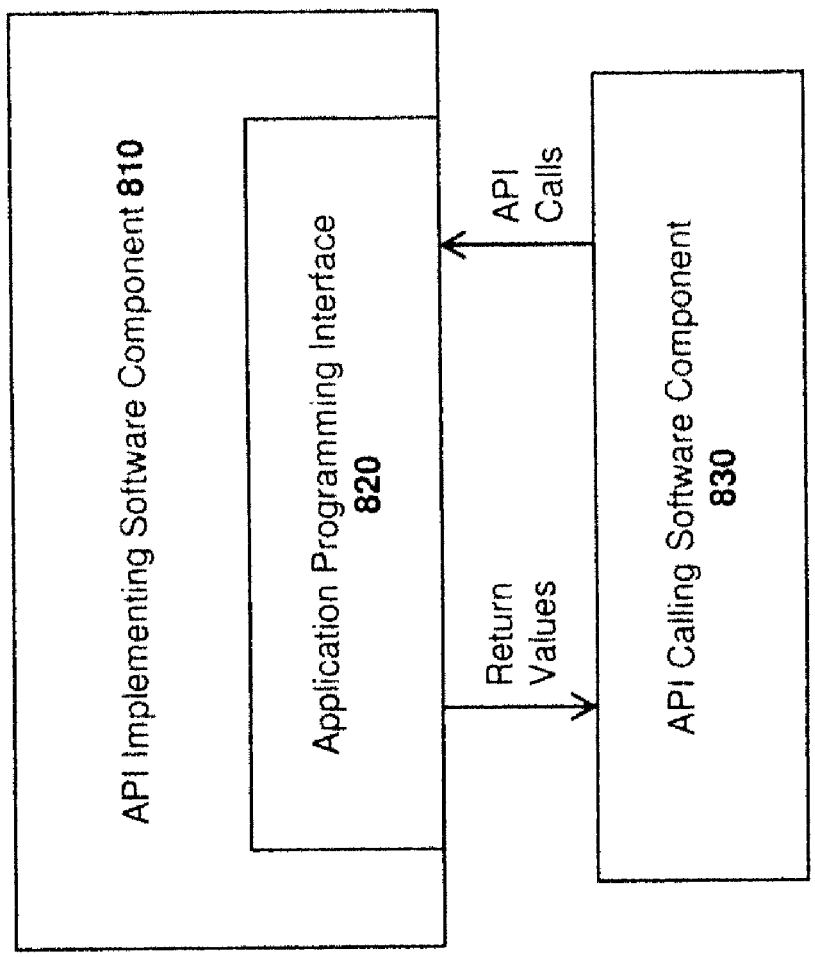
FIG. 8 illustrates one embodiment of an API implementing software component and an API calling software component.

FIG. 8 illustrates one embodiment of an API architecture which includes an API implementing software component 810 (e.g., an operating system, a library, a device driver, an API, an application program, or other software module) that implements the API 820. The API 820 specifies one or more functions, methods, classes, objects, protocols, data structures, formats and/or other features of the API implementing software component that may be used by the API calling software component 830. The API 820 can specify at least one calling convention that specifies how a function in the API implementing software component receives parameters from the API calling software component and how the function returns a result to the API calling software component. The API calling software component 830 (e.g., an operating system, a library, a device driver, an API, an application program, or other software module), makes API calls through the API 820 to access and use the features of the API implementing software component 810 that are specified by the API 820. The API implementing software component 810 may return a value through the API 820 to the API calling software component 830 in response to an API call.

It will be appreciated that the API implementing software component 810 may include additional functions, methods, classes, data structures, and/or other features that are not specified through the API 820 and are not available to the API calling software component 830. It should be understood that the API calling software component 830 may be on the same system as the API implementing software component 810 or may be located remotely and accesses the API implementing software component 810 using the API 820 over a network. While FIG. 8 illustrates a single API calling software component 830 interacting with the API 820, it should be understood that other API calling software components, which may be written in different languages (or the same language) than the API calling software component 830, may use the API 820.

The API implementing software component 2010, the API 820, and the API calling software component 830 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 9:
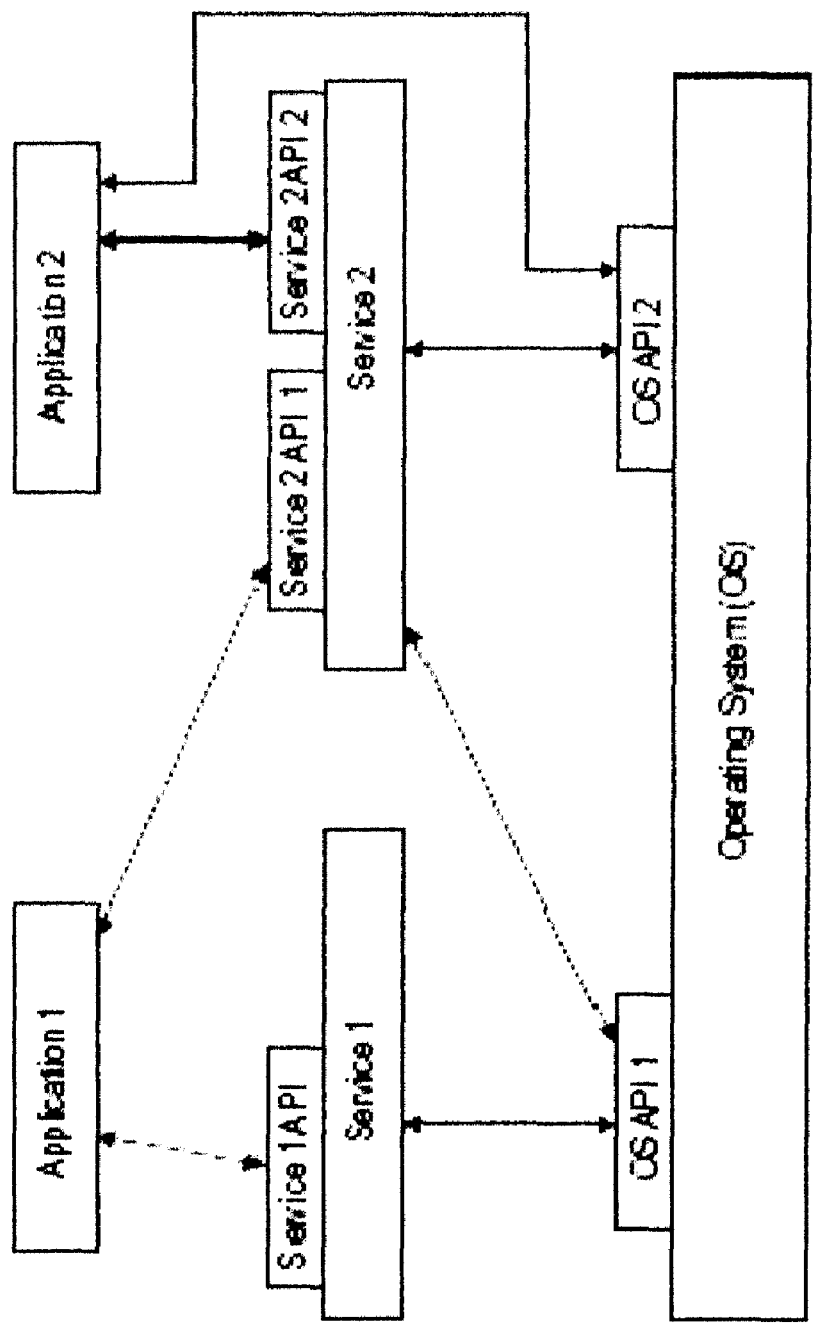
FIG. 9 illustrates one embodiment in which API calls are made between operating systems, services, and applications.

In FIG. 9 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although embodiments of the invention are described herein within the context of a mobile computing environment (i.e., using mobile devices 120-123; 601-603), the underlying principles of the invention are not limited to a mobile computing implementation. Virtually any type of client or peer data processing devices may be used including, for example, desktop or workstation computers. Accordingly, the scope and spirit of the invention should be judged in terms of the claims which follow.

What is claimed is:

1. A computer-implemented method for ensuring consistency in a friend service database comprising:
   detecting an operation which requires updates to a plurality of related friend state records;
   generating a key representing the operation;
   generating an entry in a write-ahead log database using the key, the entry specifying the updated friend state records and the type of operation to be performed on the friend state records, wherein the write-ahead log database is separate from the friend state records;
   attempting to update the plurality of friend state records; and
   if the plurality of friend state records have been successfully updated, then deleting the entry in the write-ahead log database wherein the operation comprises merging data from a friend state record associated with a handle with a friend state record associated with a known user and wherein the merging comprises:
   updating the friend state record associated with the known user to include the data from the friend state record associated with the handle.

2. The method as in claim 1 further comprising:
   identifying an entry in the write-ahead log database which has been in existence for longer than a specified threshold;
   reading the friend state records corresponding to the entry;
   determining if the friend state records corresponding to the entry are consistent; and
   if the records are not consistent, then updating the records to make the records consistent; and
   deleting the entry in the write-ahead log database corresponding to the records.

3. The method as in claim 2 wherein the operation comprises an operation which causes the friend state of two users to enter into a Friend state.

4. The method as in claim 1 wherein generating the key comprises combining identification data identifying each of the plurality of friend state records of a the plurality of users.

5. The method as in claim 4 wherein combining the identification data comprises concatenating a unique identification code associated with a first user with a unique identification code associated with a second user.

6. The method as in claim 5 wherein the identification codes are concatenated so that either the first identification code is always the larger and the second identification is always the smaller or the first identification code is always the smaller and the second identification is always the larger.

7. A method as in claim 1 wherein merging comprises:
   deleting the data from the friend state record associated with the handle.

8. A method for establishing a friend state between a first user and a second user when the second user is not known to have an account on a friend service, comprising:
- receiving a friend request from a first user directed to an electronic messaging address of a second user;
- creating, in a handle database, a handle associated with the second user to identify the second user on the friend service;
- storing a friend state record including the friend request within the handle database using the handle as an identifier for the friend state record;
- determining a friend service identification code identifying an account of the second user on the friend service;
- updating the friend state record to include the friend service identification code to identify the friend service record; wherein determining a friend service identification code further comprises:
- receiving an electronic messaging response from the second user, the electronic messaging response identifying the handle;
- receiving input from the second user to log the second user in to the friend service; and
- in response to detecting the user being logged in, associating the handle with the friend service identification code.

9. The method as in claim 8 wherein the friend service identification code comprises a unique destination signaling identifier ("DSID").

10. The method as in claim 8 wherein creating a handle comprises using the electronic messaging address of the second user as the handle.

11. The method as in claim 8 wherein creating a handle comprises hashing the electronic messaging address of the second user to generate the handle.

12. The method as in claim 8 wherein the electronic messaging address comprises an email address.

13. The method as in claim 1 wherein determining further comprises:
- embedding a uniform resource locator (URL) within an electronic message sent to the second user, the URL having data contained therein identifying the handle, wherein in response to the user selecting the URL, one or more Web pages are generated to allow the second user to log in to the friend service and/or to establish an account on the friend service.

14. A non-transitory machine-readable storage medium having program code stored thereon which, when executed by a computing device, causes the computing device to perform the operations of:
- detecting an operation which requires updates to a plurality of related friend state records;
- generating a key representing the operation;
- generating an entry in a write-ahead log database using the key, the entry specifying the updated friend state records and the type of operation to be performed on the friend state records, wherein the write-ahead log database is separate from the friend state records;
- attempting to update the plurality of friend state records; and
- if the plurality of friend state records have been successfully updated, then deleting the entry in the write-ahead log database wherein the operation comprises merging data from a friend state record associated with a handle with a friend state record associated with a known user and wherein the merging comprises:
- updating the friend state record associated with the known user to include the data from the friend state record associated with the handle.

15. The machine-readable medium as in claim 14 comprising additional program code to cause the computing device to perform the operations of:
- identifying an entry in the write-ahead log database which has been in existence for longer than a specified threshold;
- reading the friend state records corresponding to the entry;
- determining if the friend state records corresponding to the entry are consistent; and
- if the records are not consistent, then updating the records to make the records consistent; and
- deleting the entry in the write-ahead log database corresponding to the records.

16. The machine-readable medium as in claim 15 wherein the operation comprises an operation which causes the friend state of two users to enter into a Friend state.

17. The machine-readable medium as in claim 14 wherein generating the key comprises combining identification data identifying each of the plurality of friend state records of a the plurality of users.

18. The machine-readable medium as in claim 17 wherein combining the identification data comprises concatenating a unique identification code associated with a first user with a unique identification code associated with a second user.

19. The machine-readable medium as in claim 18 wherein the identification codes are concatenated so that either the first identification code is always the larger and the second identification is always the smaller or the first identification code is always the smaller and the second identification is always the larger.

20. The machine-readable medium as in claim 14 wherein merging comprises:
- deleting the data from the friend state record associated with the handle.

21. A non-transitory machine-readable storage medium having program code stored thereon which, when executed by a computing device, causes the computing device to perform the operations of:
- receiving a friend request from a first user directed to an electronic messaging address of a second user;
- creating, in a handle database, a handle associated with the second user to identify the second user on the friend service;
- storing a friend state record including the friend request within the handle database using the handle as an identifier for the friend state record;
- determining a friend service identification code identifying an account of the second user on the friend service;
- updating the friend state record to include the friend service identification code to identify the friend service record; wherein determining a friend service identification code further comprises:
- receiving an electronic messaging response from the second user, the electronic messaging response identifying the handle;
- receiving input from the second user to log the second user in to the friend service; and
- in response to detecting the user being logged in, associating the handle with the friend service identification code.

22. The machine-readable medium as in claim 21 wherein the friend service identification code comprises a unique destination signaling identifier ("DSID").

23. The machine-readable medium as in claim 21 wherein creating a handle comprises using the electronic messaging address of the second user as the handle.

24. The machine-readable medium as in claim 21 wherein creating a handle comprises hashing the electronic messaging address of the second user to generate the handle.

25. The machine-readable medium as in claim 21 wherein the electronic messaging address comprises an email address.

26. The machine-readable medium as in claim 21 wherein determining further comprises:

embedding a uniform resource locator (URL) within an electronic message sent to the second user, the URL having data contained therein identifying the handle, wherein in response to the user selecting the URL, one or more Web pages are generated to allow the second user to log in to the friend service and/or to establish an account on the friend service.

* * * * *